Nov. 25, 1952     R. D. JOHNSON     2,618,922
DETACHABLE CHAIN LINK

Filed June 12, 1950     2 SHEETS—SHEET 1

RAYMOND D. JOHNSON
Inventor

By Smith + Tuck
Attorneys

Nov. 25, 1952 — R. D. JOHNSON — 2,618,922
DETACHABLE CHAIN LINK
Filed June 12, 1950 — 2 SHEETS—SHEET 2
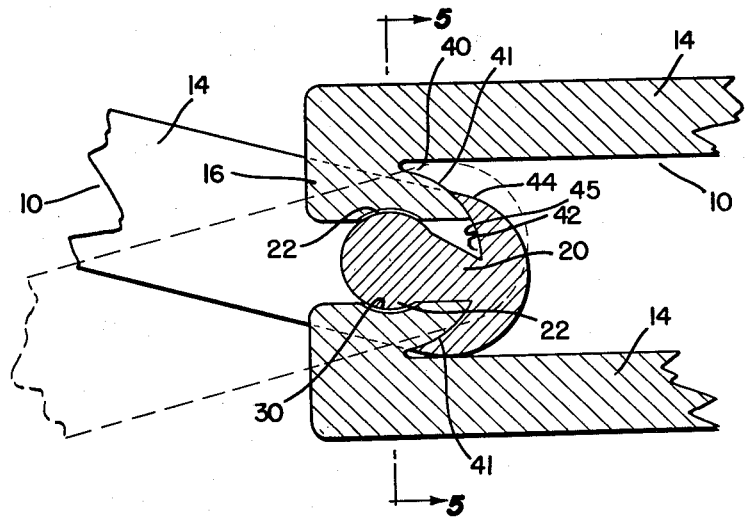
FIG. 4
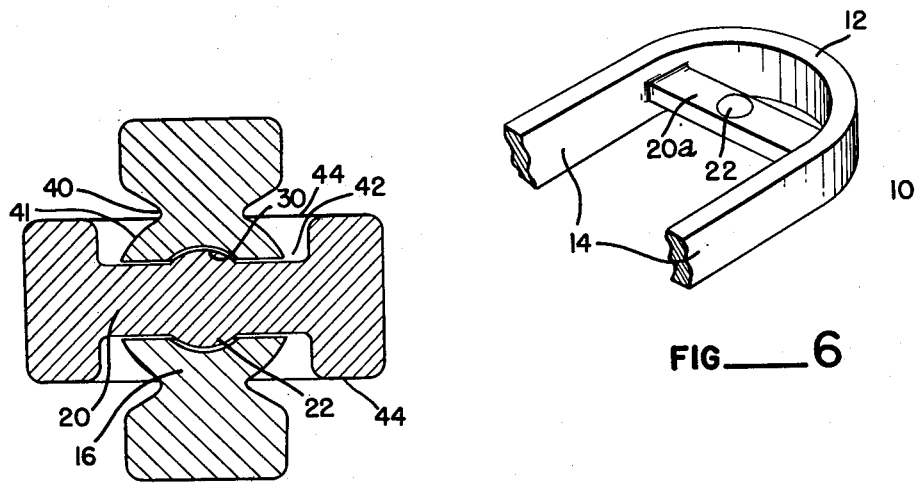
FIG. 5
FIG. 6
RAYMOND D. JOHNSON
Inventor
By Smith & Tuck
Attorneys Patented Nov. 25, 1952

2,618,922

UNITED STATES PATENT OFFICE 2,618,922

DETACHABLE CHAIN LINK

Raymond Dale Johnson, Renton, Wash.

Application June 12, 1950, Serial No. 167,532

4 Claims. (Cl. 59—85)

My invention relates to chain links, and, more particularly to detachable chain links. Each link is of a generally C-shape. A web extends across the gullet of the link and a boss is formed on each side of the web, the bosses being coaxial. A depression is formed in each of the opposed faces at the mouth of the link, the bosses in one chain link fitting in the depressions in the next chain link.

In constructing a chain link, different factors must be considered in various conditions, viz., whether aesthetic qualities are important, how much strength is needed, whether the chain links will be used with generally a common axis or whether the chain will be curved in use, whether the chain will be used in tension only or if there will be a slack or even compression during use, what kind of material will be used, and is simple and inexpensive manufacture important. Chain links have various permutations and combinations of these and other qualities.

The combination of features which are found in the present design include attractiveness, considerable strength, workability when the axes of the links are at an angle one to another, the links will not be easily disconnected when the chain is slack, the links will maintain their spacing when under some compression while the axes of the links are generally in a straight line, and the links may be easily and economically manufactured from many types of materials.

The objects of my invention include: to construct a link which has considerable strength and which is suitable for use when the axes of the links are at an angle one to another; to provide a chain with links which will not become disconnected when the chain is slack and which will maintain their spacing when under some compression while the axes of the links are generally in a straight line; to design a link of attractive appearance; and to provide a link which may be easily and economically manufactured from various types of materials.

Further objects, advantages and capabilities will be apparent from the description and disclosure in the drawings, or may be comprehended or are inherent in the device.

In the drawings:

Figure 4 is a fragmentary cross-sectional view taken on line 4—4 of Figure 2, showing in dotted lines a second position of the link on the left;

Figure 5 is a cross-sectional view taken on line 5—5 of Figure 4; and

Figure 6 is a fragmentary, perspective view showing an alternative construction of the web portion of my link.

Figure 1:
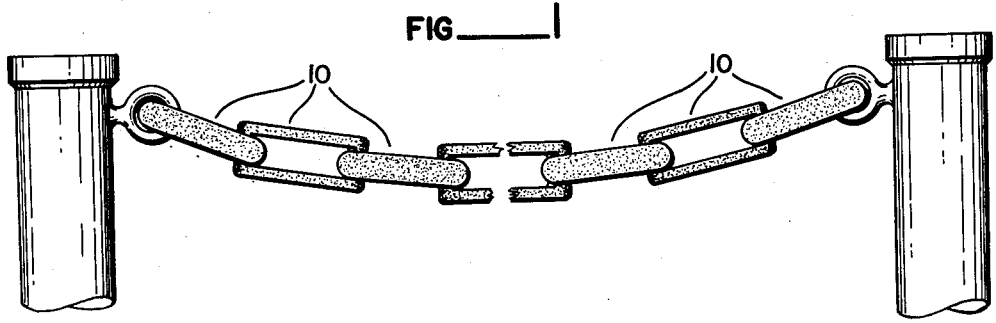
Figure 1 is a view of a chain employing my detachable chain links extending between two supporting posts.
Figure 2:
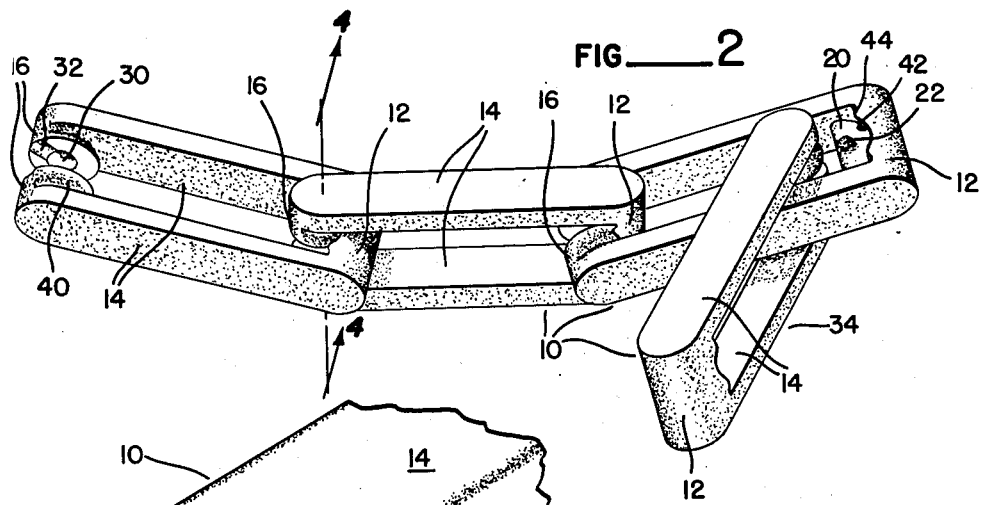
Figure 2 is a perspective view of three chain links, embodying my invention, in assembled position and one chain link in the process of being attached to an adjoining link.
Figure 3:
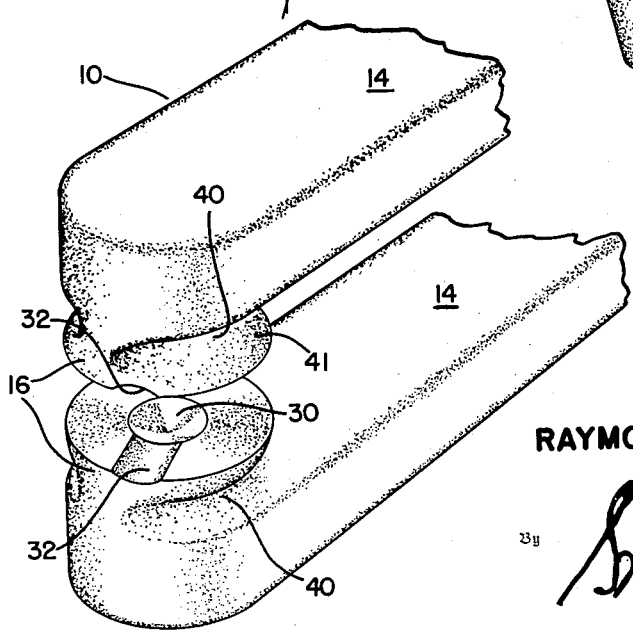
Figure 3 is a fragmentary, perspective view of the jaw portion of a link.

Referring to Figure 2 the chain is formed by a plurality of links 10. Each link is of a generally C or U shape, formed by a base or gullet 12 and opposed arms or sides 14. In the preferred form, the sides are oblong in transverse cross-section and are substantially parallel. The free ends of the arms terminate in opposed, inturned ends 16, forming jaws.

Web 20 extends from side-to-side adjacent and spaced from or joining base or gullet 12. A boss 22 extends from either side of web 20, centered between arms 14, said bosses being coaxial.

Inturned ends 16 have depressions 30 centered in opposed faces. These depressions may have various contours but the preferred form is to have bosses 22 dome shaped and depressions 30 similarly shaped. This dome shape permits considerable freedom of angular displacement of the axes of adjoining links. The maximum displacement in one plane is depicted in Figure 4. In a plane at right angles to that plane, the links may be rotated about 330 degrees.

Slot 32 leads from the edge of each inturned end 16 to depression 30. Referring to Figure 2, a link at 34 is depicted in the process of being attached to an adjoining link. The jaws of the link are inserted around an arm of the next link, the space between the jaws being wide enough to permit insertion of an arm therethrough; and then the link is rotated about that arm to the position shown in Figure 2, the space between arms being great enough to accommodate the ends of the arms during such rotation. Bosses 22 are next threaded through slots 32 and engaged in depressions 30, and the link is ready to be swung into position. It should be noted that, in the preferred form, slot 32 extends at an angle away from web 20. This prevents disengagement of adjacent links unless the links are rotated to the position shown at 34.

The opposed faces of inturned ends 16 are preferably circular. The inturned ends have relieved portions 40 toward web 20 and extending on either side. The surface of the relieved portions leading to the faces of the inturned ends, as at 41, forms portions of substantially a sphere with a center roughly coinciding with the center of rotation of the bosses in the depressions. Base portion 12 has a groove 42 on either side between web 20 and outer surfaces 44. The surface, as at 45, of each groove 42 leading to the outer surface 44 has similar shape and size to surface 41 of the inturned ends 16, whereby the two surfaces have sliding contact as adjoining links are rotated about their common center of rotation.

Bosses 22 fit loosely in depressions 30, so it is apparent that as tension is applied on a chain of my links, surfaces 41 and 45 are pressed together, and the links, in various relative angular positions, will be well secured together.

As great force is applied to the links they only become more securely fastened as the tendency is for surfaces 45 to bear against surfaces 41 and bring the jaws closer together as the force becomes greater than the resistance of arms 14 to such movement. The bearing contact between adjacent links is of considerable size comprising a substantial portion of surfaces 41 and 45 in any position.

The links will stand a certain amount of compression, when adjacent links are substantially in line, without collapsing due to the coaction of bosses 22 and depressions 32. A satisfactory link, where little force is going to be used, as in primarily oranamental chains, is depicted in Figure 6 where the securing means between adjoining links is entirely through the coaction of bosses 22 and depressions 32.

In this embodiment, web 20a does not join with gullet 12. Other forms of my invention in which there are no coacting surfaces as 41, 45, but in which adjacent links are held together by the bosses and depressions, will be apparent to those skilled in the art.

The links may be manufactured from various materials according to the strength needed and the appearance desired. The links may be formed by an inexpensive molding operation.

It is believed that it will be clearly apparent from the above description and the disclosure in the drawings that the invention comprehends a novel construction of detachable chain links.

Having thus disclosed the invention, I claim:

1. In a chain, a chain link, comprising: a U-shaped body formed by a base portion and two side portions, there being a web between said side portions and joining with said base portion, said base portion having channels between its outer surface and said web; said side portions having inwardly extending ends forming jaws and terminating in flat circular surfaces, the circular surface on one side portion facing the corresponding surface on the other side portion; each circular surface having a depression in the center thereof and a slot leading from the forward edge of the circular surface generally toward the base portion and joining said depression; there being a boss on either side of said web and centered between the side portions, said boss being of a size to fit the depression and to be insertable through the slot formed in the jaws of an adjoining chain link; and each inwardly extending end having a relieved portion spaced from said flat circular surface to afford room for the portions of the base portion outside of said channels, of an adjacent link, to pivot into said relieved portion.

2. The subject matter of claim 1 in which said bosses are dome shaped.

3. In a chain, a chain link, comprising: a generally U-shaped body formed by a base portion and two side portions, there being a web connecting the two side portions adjacent the base portion, there being a boss on either side of said web and centered between the two side portions within the general U-shape of the link; the free ends of said side portions having inwardly turned portions forming jaws; said inwardly turned portions having depressions in their ends, the bosses in one chain link adapted to fit in the depressions in the next chain link.

4. In a chain, a chain link, comprising: a generally C-shaped link; a web across the gullet of the link; a dome shaped boss on each side of said web, said bosses being coaxial; the opposed faces at the mouth of said link being generally circular and each face having a depression, the bosses in one chain link fitting in the depressions in the next chain link; said link having relieved portion adjacent each of said opposed faces, the surface of each relieved portion leading to the opposed face forming portions of substantially a sphere with a center roughly coinciding with the common center of rotation of said chain link and its adjacent chain link; and said link having a groove between each side of said web and the adjacent outer surface of said link, the surface of each groove leading to said outer surface having a similar shape and size to said surface of said relieved portion, whereby there is sliding contact between the surface of the relieved portion leading to the opposed face of one link and the surface of the groove leading to the outer surface of the adjacent link.

RAYMOND DALE JOHNSON.

REFERENCES CITED

The following references are of record in the file of this patent:

UNITED STATES PATENTS

| Number | Name | Date |
|---|---|---|
| 686,977 | Kidd | Nov. 19, 1901 |
| 734,998 | Thompson | July 28, 1903 |
| 1,171,947 | Harnly | Feb. 15, 1916 |
| 1,744,274 | Lotter | Jan. 21, 1930 |

FOREIGN PATENTS

| Number | Country | Date |
|---|---|---|
| 838,752 | France | Dec. 16, 1938 |